United States Patent [19]

Gilberts

[11] 4,241,374

[45] Dec. 23, 1980

[54] SURGE VOLTAGE ARRESTER WITH VENTSAFE FEATURE

[75] Inventor: Alexander G. Gilberts, Algonquin, Ill.

[73] Assignee: Reliable Electric Company, Franklin Park, Ill.

[21] Appl. No.: 7,363

[22] Filed: Jan. 29, 1979

[51] Int. Cl.[3] .......................... H02H 3/22; H02H 9/06

[52] U.S. Cl. ...................................... 361/124; 337/32; 337/34; 361/119; 361/120

[58] Field of Search ............... 361/124, 120, 119, 118, 361/117, 129, 125; 315/125, 36, 306, 325; 313/231.1, 217; 337/31, 32, 33, 161, 166, 186, 239, 15, 17, 18, 28

[56] References Cited

U.S. PATENT DOCUMENTS

| | | | |
|---|---|---|---|
| 3,254,179 | 5/1966 | Howard | 361/124 X |
| 3,254,181 | 5/1966 | Lemieux | 373/118 |
| 3,569,786 | 3/1971 | Kunugi | 361/131 |
| 3,651,440 | 3/1972 | Bahr et al. | 361/124 X |
| 3,755,715 | 8/1973 | Klayum et al. | 361/124 X |
| 3,803,524 | 4/1974 | Schmalz et al. | 337/32 X |
| 4,002,952 | 1/1977 | Menninga | 361/124 |
| 4,056,840 | 11/1977 | Lundsgaard et al. | 361/119 X |
| 4,062,054 | 12/1977 | Simokat | 361/119 |

*Primary Examiner*—Patrick R. Salce
*Attorney, Agent, or Firm*—Trexler, Wolters, Bushnell & Fosse, Ltd.

[57] ABSTRACT

A surge voltage arrester assembly comprises a primary gas tube surge arrester and an air gap secondary arrester that provides surge protection should the gas tube become vented to atmosphere. The secondary arrester has the air gap defined by a rim of one of the gas tube electrodes and a metallic cup into which the gas tube is positioned. In a three element version of the invention wherein the gas tube has two line electrodes and a ground electrode, metallic cups are provided at opposite ends of the gas tube to cooperate with the ground electrode for forming secondary air gaps for each line electrodes. An O-ring and a sealing compound seals each secondary air gap against the entrance of contaminants.

5 Claims, 4 Drawing Figures

SURGE VOLTAGE ARRESTER WITH VENTSAFE FEATURE

BACKGROUND OF THE INVENTION

This invention relates to improvements surge voltage arresters for line protectors of the type used for protecting telephone lines and like communication lines from over-voltage and over-current conditions.

Surge voltage arrester of the cold cathode gas discharge tube type serve as the primary arrester and source of protection in various line protectors. Such line protectors may also include a carbon or other type of air gap back-up protector in the event of a failure of the primary surge arrester as a result of leakage of gas from the tube due to a broken seal or similar damage. A gas tube arrester which has failed in this manner will be difficult to detect because the line to which it is connected continues to operate properly. Thus, it is desirable to provide some type of air gap or secondary surge arrester as a "back-up" or vent safe feature in the event of failure of the gas tube arrester. Line protectors embodying these surge voltage arresters are frequently installed under conditions wherein dust, moisture and other contaminants can enter the secondary air gap. This can alter the breakdown voltage characteristics of the air gap and possibly reduce its reliability.

SUMMARY OF THE INVENTION

An object of this invention is to provide an improved surge voltage arrester assembly that utilizes a gas tube as a primary surge arrester and a sealed air gap or secondary surge arrester in the event of failure of the gas tube arrester due to leakage or from other causes. The assembly may be of the type having either a two electrode or a three electrode gas tube.

A further object of this invention is to provide an arrester assembly of the type stated which is compact and economical to produce, and which may be embodied into conventional line protectors of the so-called station protector or central office types.

In accordance with the foregoing objects, the surge voltage arrester assembly, whether of the two or three electrode type, has a primary surge arrester of the cold cathode gas tube type and a secondary arrester of the air gap type. The breakdown voltage of the secondary arrester is greater than the breakdown voltage of the primary arrester. The arresters are adapted to be connected to form parallel electric circuits from a line to be protected to ground. The secondary arrester has the air gap defined by an annular portion of a metallic cup that contains the gas tube and also by the rim of an electrode that forms part of the gas tube. The air gap is annular in configuration. Means are provided for sealing the gas tube in the cup so as to prevent contaminants from entering the air gap. The sealing means includes an annular pliable ring interposed between the electrode and the aforesaid annular portion.

This pliable ring may be of an elastomeric composition. Furthermore, the sealing means may include a sealing compound over a part of the ring and sealing against the electrode and the annular portion.

In a three electrode version of the invention there is a first or ground electrode, and second and third or line electrodes at opposite ends of the first or ground electrodes. The electrodes are sealed together and insulated from each other so that there is a primary arc gap in the tube between each of the line electrodes and the ground electrode. The means forming each secondary or back-up air gap external to the gas tube is defined by a rim of the ground electrode and a surrounding cylindrical cup that receives a line electrode and part of the ground electrode. The seal for the secondary air gap comprises a pliable elastomeric ring between the cup and the ground electrode. A sealing compound is preferably applied in the space between the cup and the ground electrode.

DETAILED DESCRIPTION

Figure 1:
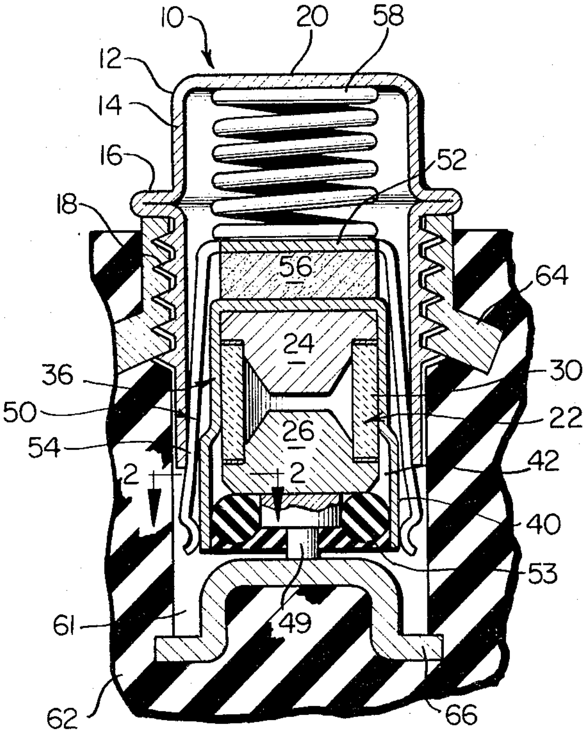
FIG. 1 is a sectional view of a surge voltage arrester assembly of the present invention and shown embodied in a known type of line protector.

Referring now to the drawing there is shown a station protector 10 embodying a surge voltage arrester assembly of the invention. The protector comprises a sheet metal housing or cap 12 having an annular sidewall portion 14 containing an annular flange or stop-shoulder 16. Below the shoulder 16, the sidewall 14 is formed with a screw thread 18 for threading into the well 61 of a protector block 62, as will be presently more fully described. The cap 12 also includes an end wall 20 which is opposite to the open end of the cap 12.

Mounted within the cap 12 are several coaxial parts which provide the primary and secondary surge arrester assembly of the invention. More specifically, there is a gas tube 22 having opposed electrodes 24, 26 that define an arc gap 28 therebetween. The electrodes 24, 26 are separated by a tubular insulator 30 of ceramic or the like to which the electrodes 24, 26 are brazed or soldered in the usual manner. Thus, the electrodes respectively have annular electrode flanges 32, 34 at which the electrodes 24, 26 are silver soldered to the ends of the insulator 30 by rings 27.

The gas tube 22 is coaxially housed within a tubular structure that is in the form of a metallic cup 36 having a cylindrical sidewall 38. The gas tube 22 fits closely within the confines of the cup 36 although the gas tube and parts assembled therewith may slide relative to the cup so as to facilitate assembly of those parts.

Near the open end of the cup 36 the sidewall 38 has diametrally enlarged annular cylindrical end portion 40 which surrounds the peripheral edge of the electrode flange 34. This end portion 40 defining the open end of the cup 36 is radially spaced from the electrode flange 34 and from an adjacent part of the insulator 30 so as to define a secondary air gap 42 of annular configuration.

The electrode flange 34 has a metal contact thereagainst formed by two coaxial cylindrical sections 47, 49 of successively smaller diameters. The larger diameter section 47 forms with the adjacent end surface of the flange 34 a groove 51 for receiving an annular O-ring 53. The O-ring 53 is of pliable material, preferably an elastomer, for example silicone rubber, although other elastomers might also be suitable. The O-ring is of a width such that it substantially spans the gap between the section 47 and the end portion 40. A sealing compound 55 may, if necessary, be disposed over the O-ring 53 and seals against a portion thereof. The compound 55, which may also be a silicone, is applied against the end portion 40 and the surfaces of the sections 47, 49. As a result, the secondary air gap 42 is sealed against contaminants.

The metallic cup 36 is coaxially housed within a metallic grounding cage 50 having an end wall 52 and a plurality of circumferentially spaced, spring-like fingers 54. The spring fingers are compressed radially inwardly when the cup 36, together with the arrester assembly, are inserted as a unit within the open end of the cup sidewall 14. In this regard a solder pellet 56 is inserted into the cage 50 prior to insertion of the assembled cup and gas tube so that the solder pellet lies between the end wall of the cup 36 and the end wall 52 of the cage 50. A coil compression spring 58 bears at one end on the end wall 20 and at its opposite end against the flat end wall 52 of the grounding cage. During assembly of the protector, the sealing ring 53 and the sealing compound 55 prevent the gas tube 22 from coming out of the cup 36. The arcuate tips 60 of the spring fingers 54 apply inward pressure against the cylindrical cup end portion 40.

The protector 10 is adapted to be mounted in the well 61 of the dielectric block or receptacle 62. This block, which is of known construction, has a metallic contact member 64 with an internal thread as shown for receiving the cap thread 18. This contact member 64 is usually connected to ground. At the bottom of the well 61 is a metallic contact 66 which is electrically connected to the electrode 26 through its section 49. Contact 66 is connected to the line to be protected. In threading the protector 10 into the ground contact member 64 to the limit of the stop-shoulder 16, the extreme end of the section 49 will firmly engage the line contact 66 by reason of the force of the spring 58.

The arc gaps 28 and 42 are electrically coupled in parallel circuits from the line contact 66 to the ground contact 64. The width of the arc gap 42 is such that its breakdown voltage is greater than that of the breakdown voltage across the arc gap 28 of the gas tube 22. Consequently, when the gas tube arrester is operating properly as a primary surge arrester an over-voltage on the line to be protected will result in a discharge across the gas tube arc gap 28 to ground. The secondary surge arrester will not discharge across the air gap 42. However, if the gas tube should fail due to leakage, some protection will be afforded by a discharge to ground across the air gap 42 even though the breakdown voltage thereacross is somewhat higher than the breakdown voltage across the gas tube when the latter is functioning normally.

In an overcurrent condition on the line due, for example, to a prolonged voltage above the arcing voltage of the gas tube, the heat within the protector 10 will cause the solder pellet 56 to melt whereupon the force of the spring 58 will press the tips 60 of the grounding cage into direct metallic contact with the line contact 66. This results in a direct metallic connection of the line to be protected from the line contact 66 to the ground contact member 64.

Figure 4:
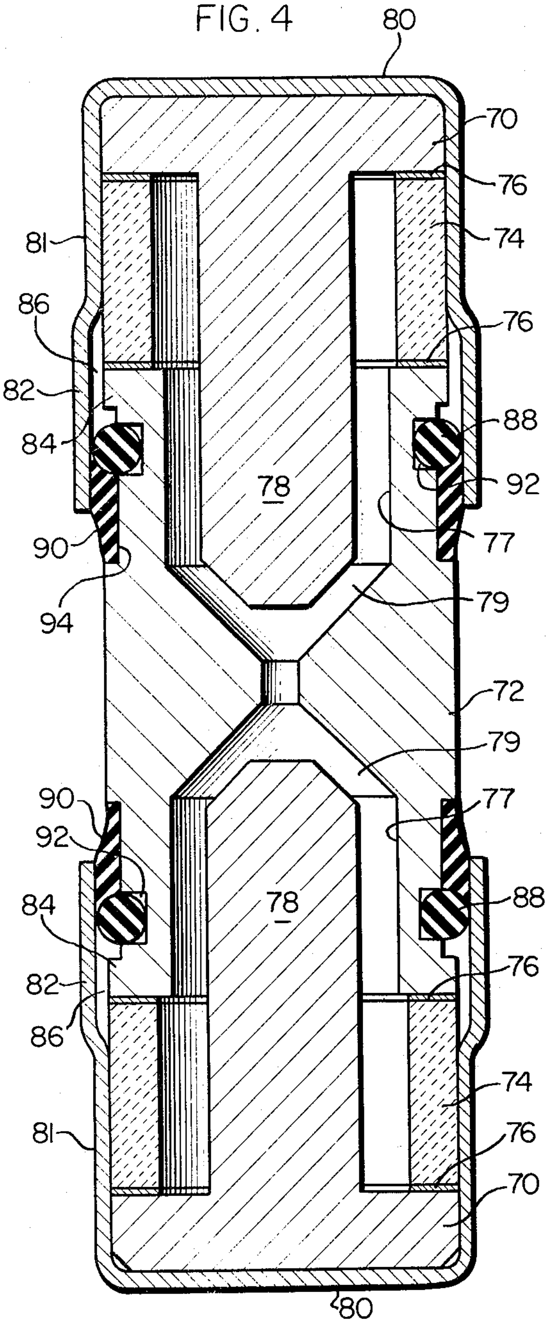
FIG. 4 illustrates a three element gas tube form of the invention and with the section line taken along the longitudinal axis of the tube.

A three element gas tube version of the arrester assembly is shown in FIG. 4. The primary or gas tube surge arrester comprises opposed line electrodes 70, 70 and a center or ground electrode 72. The several electrodes are insulated from each other by ceramic insulators 74, 74 which are soldered by rings 76 to the respective electrodes. The center or ground electrode 72 is hollow to provide communicating coaxial cavities 77, 77 that receive stem portions 78, 78 of the line electrodes 70, 70. The stem portions 78, 78 cooperate with the ground electrode to provide primary arc gaps 79, 79 from each line electrode to ground.

A secondary air gap is also provided between each line electrode 70 and the ground electrode 72. A metallic cup 80, similar to cup 36, receives and contacts a line electrode such that the open ends of the cups 80, 80 face each other. Each cup has a cylindrical sidewall 81 with a diametrally enlarged annular cylindrical end portion 82 that is spaced from a rim 84 of the ground electrode 72 to provide an annular secondary air gap 86.

The sealing arrangement for each air gap 86 also utilizes a pliable elastomeric annular O-ring 88 and a sealing compound 90. The O-ring fits into an annular groove 92 in the ground electrode and is sized to engage the end portion 82. The sealing compound 90 is disposed in a second annular groove 94 in the ground electrode 72 and seals against that electrode as well as against the O-ring 88 and the end portion 82.

The cups 80, 80 may be sized to fit into a clip type receptacle for respective connections to the two sides of the telephone line to be protected. The center electrode may receive a clip or other connector in the region between the two bands of sealing compound 90, 90. Other conventional mountings for the gas tube may be made as it is essentially cylindrical in configuration and so lends itself to ready adaptation to known mountings.

Figure 2:
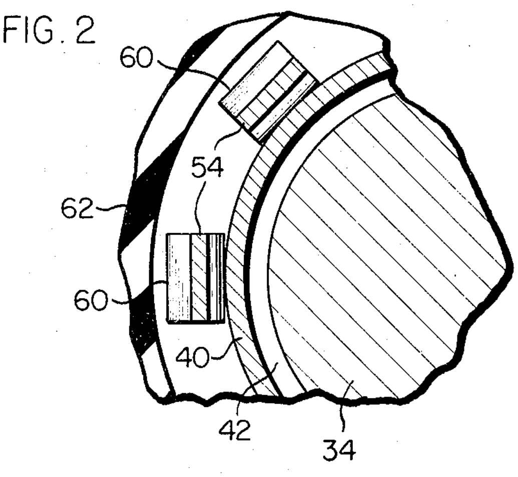
FIG. 2 is a fragmentary sectional view on an enlarged scale taken along line 2—2 of FIG. 1.
Figure 3:
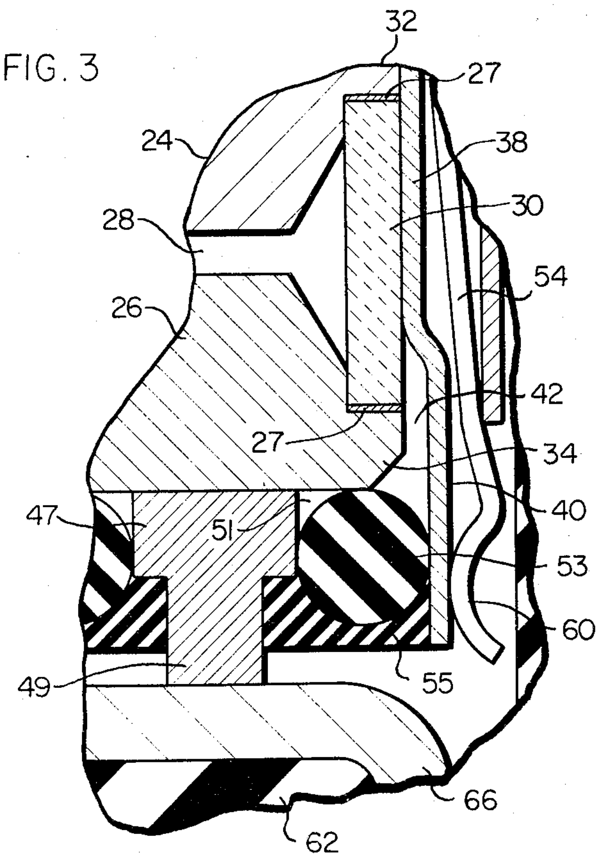
FIG. 3 is an enlarged fragmentary portion of FIG. 1.

As in FIGS. 1–3, the primary arc gaps 79, 79 have breakdown voltages less than that of the secondary air gaps 86, 86 except when the gas tube becomes vented, in which case the air gaps have the lower breakdown voltage. As a result "vent-safe" protection is provided for each side of the protected line.

This invention is claimed as follows:

1. A surge voltage arrester assembly comprising a first electrode, second and third electrodes at opposite ends respectively of said first electrode, said electrodes being sealed together and insulated from each other to form a sealed gas tube in which there is a primary arc gap in the tube between each of said second and third electrodes and said first electrode, and means forming secondary arc gaps external of the gas tube and between said first electrode and each of said second and third electrodes, each said secondary arc gap being of the air gap type and having a breakdown voltage greater than the breakdown voltage of either primary arc gap but having a breakdown voltage less than that of each primary arc gap should the gas tube become vented to atmosphere, each secondary arc gap being defined by a rim portion of said first electrode and a surrounding cylindrical element that is in electrical contact with one of said second and third electrodes, and means forming a seal for each secondary arc gap to prevent contaminants from entering each said secondary arc gap, said means forming the seal for each secondary arc gap spanning the space between said cylindrical element and said first electrode.

2. A surge voltage arrester assembly according to claim 1 in which said means forming the seal comprises a ring.

3. A surge voltage arrester assembly according to claim 1 in which said ring is seated in a groove in said first electrode, and a sealing compound is disposed over part of said ring and is sealed to said cylindrical element and to said first electrode.

4. A surge voltage arrester assembly according to claim 1 in which said cylindrical element for each secondary arc gap forms an end portion of a cup which defines an open end of that cup to receive the first electrode and one of the second and third electrodes, the open ends of the cups facing each other.

5. A surge voltage arrester assembly having a primary surge arrester of the cold cathode gas tube type and a secondary surge arrester of the air gap type, the breakdown voltage of the secondary arrester being greater than the breakdown voltage of the primary arrester, said arresters being housed together and being adapted to be connected to form parallel electric circuits from a line to be protected to ground, said secondary arrester having its air gap defined by an annular portion of a metallic cup that contains said gas tube and a rim of an electrode that forms part of said gas tube, said air gap being annular in configuration, and means sealing said gas tube in said cup to prevent contaminants from entering said air gap; said sealing means including an annular pliable ring and a contact engaging said electrode and projecting through said ring; said contact being spaced from said annular portion, and means forming an annular groove for receiving said pliable ring, said pliable ring spanning the space between said contact and said annular portion.

* * * * *